US011947452B2

(12) United States Patent
Tang et al.

(10) Patent No.: US 11,947,452 B2
(45) Date of Patent: Apr. 2, 2024

(54) CONTROLLING VARIATION OF VALID DATA COUNTS IN GARBAGE COLLECTION SOURCE BLOCKS

(71) Applicant: Micron Technology, Inc., Boise, ID (US)

(72) Inventors: Xiangyu Tang, San Jose, CA (US); David Ebsen, Minnetonka, MN (US); Ying Huang, Boise, ID (US); Sundararajan Sankaranarayanan, Fremont, CA (US)

(73) Assignee: Micron Technology, Inc., Boise, ID (US)

( * ) Notice: Subject to any disclaimer, the term of this patent is extended or adjusted under 35 U.S.C. 154(b) by 49 days.

(21) Appl. No.: 17/830,047

(22) Filed: Jun. 1, 2022

(65) Prior Publication Data

US 2023/0393976 A1 Dec. 7, 2023

(51) Int. Cl.
*G06F 12/02* (2006.01)
*G06F 3/06* (2006.01)

(52) U.S. Cl.
CPC ........ *G06F 12/0253* (2013.01); *G06F 3/0604* (2013.01); *G06F 3/0652* (2013.01); *G06F 3/0679* (2013.01)

(58) Field of Classification Search
CPC ..... G06F 3/0652; G06F 3/0604; G06F 3/0679
See application file for complete search history.

(56) References Cited

U.S. PATENT DOCUMENTS

| | | | | |
|---|---|---|---|---|
| 6,321,238 B1 * | 11/2001 | Putzolu | ........... | G06F 16/27 |
| 6,341,340 B1 * | 1/2002 | Tsukerman | ........... | G06F 16/27 |
| | | | | 707/E17.007 |
| 7,610,437 B2 * | 10/2009 | Sinclair | ........... | G06F 3/0652 |
| | | | | 711/104 |
| 7,984,084 B2 * | 7/2011 | Sinclair | ........... | G06F 16/1847 |
| | | | | 707/818 |
| 8,285,918 B2 * | 10/2012 | Maheshwari | ........... | G11C 7/1072 |
| | | | | 711/159 |
| 8,443,263 B2 * | 5/2013 | Selinger | ........... | G06F 11/1068 |
| | | | | 714/768 |
| 8,873,284 B2 * | 10/2014 | Sinclair | ........... | G06F 12/0246 |
| | | | | 365/185.11 |
| 9,223,693 B2 * | 12/2015 | Sinclair | ........... | G06F 12/0246 |
| 9,336,133 B2 * | 5/2016 | Sinclair | ........... | G06F 12/0246 |

(Continued)

FOREIGN PATENT DOCUMENTS

| | | | |
|---|---|---|---|
| EP | 3923130 A1 * | 12/2021 | ......... G06F 12/0246 |
| KR | 20200086472 A * | 7/2020 | |

(Continued)

*Primary Examiner* — Christopher D Birkhimer
(74) *Attorney, Agent, or Firm* — Schwegman Lundberg & Woessner, P.A.

(57) ABSTRACT

A subset of blocks from a set of blocks of a memory device are identified based on a valid data count constraint. A first block from the subset of blocks is selected based on a valid data count of the first block. A second block from the subset of blocks is selected based on a data temperature of the second block. A comparison of the first block and the second block is performed in accordance with one or more comparison criterion. The first block or the second block is selected as a garbage collection source block based on the comparison. Garbage collection is performed at the garbage collection source block.

20 Claims, 7 Drawing Sheets

(56) References Cited

U.S. PATENT DOCUMENTS

| | | | | |
|---|---|---|---|---|
| 9,348,746 | B2* | 5/2016 | Sinclair | G06F 12/0246 |
| 9,465,731 | B2* | 10/2016 | Sinclair | G06F 12/0246 |
| 9,734,050 | B2* | 8/2017 | Sinclair | G06F 12/0253 |
| 9,734,911 | B2* | 8/2017 | Sinclair | G06F 3/0658 |
| 9,778,855 | B2* | 10/2017 | Sinclair | G06F 3/064 |
| 10,108,543 | B1* | 10/2018 | Duggal | G06F 11/14 |
| 10,108,544 | B1* | 10/2018 | Duggal | G06F 11/14 |
| 10,120,613 | B2* | 11/2018 | Sinclair | G06F 12/02 |
| 10,133,490 | B2* | 11/2018 | Sinclair | G06F 3/0655 |
| 10,255,179 | B2* | 4/2019 | Ji | G06F 3/0659 |
| 10,430,279 | B1* | 10/2019 | Dittia | G06F 3/0656 |
| 10,552,058 | B1* | 2/2020 | Jadon | G06F 3/0647 |
| 10,739,996 | B1* | 8/2020 | Ebsen | G06F 16/1727 |
| 10,795,812 | B1* | 10/2020 | Duggal | G06F 3/067 |
| 10,824,339 | B1* | 11/2020 | Brooker | G06F 3/0664 |
| 10,983,715 | B2* | 4/2021 | Sharoni | G06Q 20/3821 |
| 11,086,537 | B2* | 8/2021 | Byun | G06F 3/0679 |
| 2006/0004957 | A1* | 1/2006 | Hand, III | G06F 12/0866 |
| | | | | 711/E12.019 |
| 2007/0033325 | A1* | 2/2007 | Sinclair | G06F 3/0608 |
| | | | | 711/170 |
| 2008/0082596 | A1* | 4/2008 | Gorobets | G06F 12/0253 |
| 2008/0189477 | A1* | 8/2008 | Asano | G06F 12/0246 |
| | | | | 711/E12.008 |
| 2009/0043831 | A1* | 2/2009 | Antonopoulos | G06F 3/0614 |
| 2009/0276588 | A1* | 11/2009 | Murase | G06F 3/0647 |
| | | | | 711/E12.071 |
| 2011/0137870 | A1* | 6/2011 | Feder | H04L 67/1001 |
| | | | | 707/662 |
| 2011/0145473 | A1* | 6/2011 | Maheshwari | G06F 12/12 |
| | | | | 711/E12.008 |
| 2011/0161784 | A1* | 6/2011 | Selinger | G06F 11/1016 |
| | | | | 714/E11.002 |
| 2011/0264843 | A1* | 10/2011 | Haines | G06F 3/0679 |
| | | | | 711/170 |
| 2014/0325148 | A1* | 10/2014 | Choi | G06F 3/0659 |
| | | | | 711/114 |
| 2014/0365719 | A1* | 12/2014 | Kuzmin | G06F 12/0246 |
| | | | | 711/103 |
| 2015/0227602 | A1* | 8/2015 | Ramu | G06F 11/1456 |
| | | | | 707/634 |
| 2016/0246713 | A1* | 8/2016 | Choi | G06F 3/0608 |
| 2017/0123655 | A1* | 5/2017 | Sinclair | G06F 3/061 |
| 2017/0242790 | A1* | 8/2017 | O'Krafka | G06F 3/0679 |
| 2017/0336972 | A1* | 11/2017 | Shaw | G06F 16/2453 |
| 2018/0143902 | A1* | 5/2018 | Hong | G06F 11/1048 |
| 2018/0189175 | A1* | 7/2018 | Ji | G06F 3/0679 |
| 2018/0190329 | A1* | 7/2018 | Kathawala | G06F 12/0246 |
| 2018/0357008 | A1* | 12/2018 | Hirt | G06F 12/02 |
| 2020/0065239 | A1* | 2/2020 | Shayesteh | G06F 12/0253 |
| 2020/0089420 | A1* | 3/2020 | Sharoni | G06F 21/79 |
| 2020/0192794 | A1* | 6/2020 | Lee | G06F 12/0246 |
| 2020/0218653 | A1* | 7/2020 | Ryu | G06F 12/0253 |
| 2020/0310686 | A1* | 10/2020 | Truong | G06F 3/061 |
| 2021/0055862 | A1* | 2/2021 | Mulholland | G06F 3/0685 |
| 2021/0157499 | A1* | 5/2021 | Liu | G06F 3/064 |
| 2021/0240613 | A1* | 8/2021 | Na | G06F 12/0253 |
| 2021/0263647 | A1* | 8/2021 | You | G06F 3/061 |
| 2021/0342362 | A1* | 11/2021 | Haravu | G06F 11/1464 |
| 2022/0100652 | A1* | 3/2022 | Liu | G06F 16/162 |

FOREIGN PATENT DOCUMENTS

| | | | | |
|---|---|---|---|---|
| TW | 201205286 A | * | 2/2012 | G06F 12/00 |
| TW | 202203227 A | * | 1/2022 | G06F 12/0804 |
| TW | 202209333 A | * | 3/2022 | G06F 3/0608 |
| WO | WO-2020000492 A1 | * | 1/2020 | G06F 12/023 |
| WO | WO-2021027050 A1 | * | 2/2021 | G06F 12/0246 |
| WO | WO-2022017002 A1 | * | 1/2022 | |

* cited by examiner

CONTROLLING VARIATION OF VALID DATA COUNTS IN GARBAGE COLLECTION SOURCE BLOCKS

TECHNICAL FIELD

Embodiments of the disclosure relate generally to memory sub-systems and more specifically to controlling variation of valid data counts in garbage collection source blocks of a memory sub-system.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
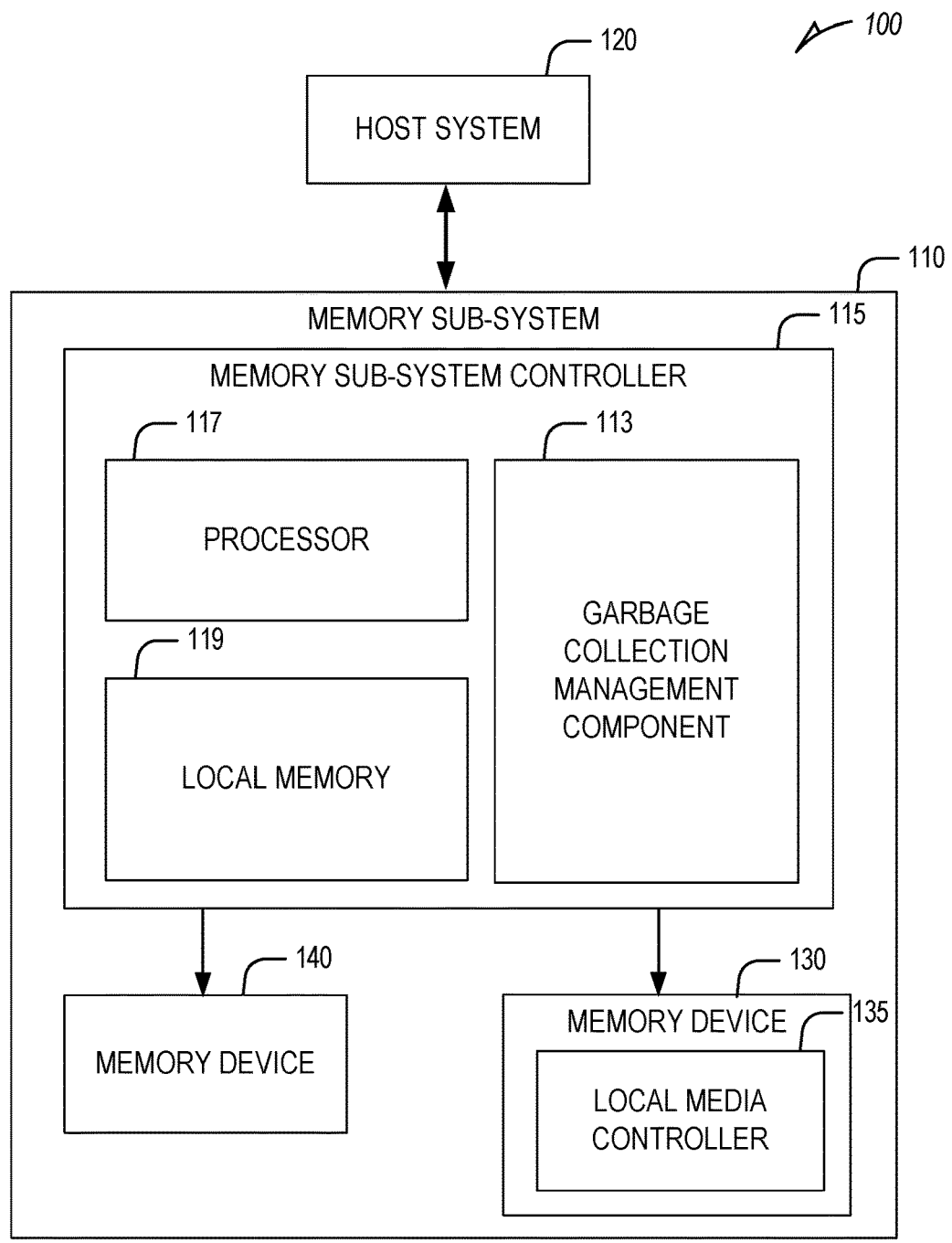
FIG. 1 is a block diagram illustrating an example computing system that includes a memory sub-system, in accordance with some embodiments of the present disclosure.

Aspects of the present disclosure are directed to controlling variation of valid data counts (VDC) in garbage collection source blocks in a memory sub-system. A memory sub-system can be a storage device (e.g., solid-state drive (SSD)), a memory module, or a combination of a storage device and memory module. Examples of other storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A memory device can be a non-volatile memory device. One example of non-volatile memory devices is a negative-and (NAND) memory device. Other examples of non-volatile memory devices are described below in conjunction with FIG. 1. Each of the non-volatile memory devices can include one or more arrays of memory cells. A memory cell ("cell") is an electronic circuit that stores information. Depending on the cell type, a cell can store one or more bits of binary information, and has various logic states that correlate to the number of bits being stored. The logic states can be represented by binary values, such as "0" and "1", or combinations of such values.

Various memory access operations can be performed on the memory cells. Data can be written to, read from, and erased from memory cells. Memory cells can be grouped into a write unit, such as a page. For some types of memory devices, a page is the smallest write unit. A page size represents a particular number of cells of a page. For some types of memory devices (e.g., NAND), memory cells can be grouped into an erase unit, such as a physical block, which is a group of pages. A physical block is a 2-dimensional memory array of pages (rows of cells) and strings (columns of cells). Data can be written to a block, page-by-page. Data can be erased at a block level. However, portions of a block cannot be erased.

Garbage collection is a process performed at memory devices to improve write performance. In general, the goal of garbage collection is to optimize space and improve efficiency of a memory device by keeping as many empty blocks as possible so that the memory device does not have to wait for a block to be erased before performing a write operation. As an example, when a host system is to write new data to a used block of a memory device, pages in the block with stale data cannot be used until they are erased, though as mentioned above, data is erased at the block level and not at the page level. As an additional challenge to management of the memory device, a block with pages that contain stale data may include a number of pages that contain valid data, which is referred to as the VDC of the block. To be able to use the pages with the stale data, garbage collection is performed. With garbage collection, pages containing valid data have to be copied to an empty block, and the previous block is completely erased before being able to be used. More specifically, garbage collection includes copying all pages with valid data to an empty block, updating a logical block address (LBA) with the new location, erasing the block including the pages with stale data, and adding the block to a free block pool. This constant shifting of data can result in many more program/erase (P/E) cycles than requested by the host system, a situation referred to as write amplification.

The block to be erased after valid data is moved to a new block is referred to as the "garbage collection source block." In a first garbage collection scheme, the garbage collection source block is the block with the lowest VDC. This scheme is often referred to as the "greedy VDC scheme" or "minimum VDC scheme." A second garbage collection scheme seeks to reduce write amplification by identifying a "data temperature" of potential garbage collection source blocks and selecting an optimum block based on VDC and the data temperature of the block. As used herein, "data temperature" of a block refers to a frequency with which data stored by the block is updated. The selection criterion for these schemes seeks to segregate "hot" data (data that is frequently updated), "cold" data (data that is infrequently updated) and data with various other frequencies into different destination blocks to optimize the GC collection rates of the blocks of different temperatures so that the overall write amplification is reduced. This second scheme is also referred to as a "2D-greedy scheme."

Consistent performance is paramount for memory devices, so much so that manufacturing standards often specify minimum requirements for variation in performance. In performing garbage collection there can be fluctuations in the amount of VDC in the garbage collection source block. Existing mechanisms exist in memory devices to identify and track a stable ratio of garbage collection to host writes for the dual purpose of maintaining performance consistency and availability of free space in the memory device.

Unlike the greedy VDC scheme, the 2D-greedy scheme frequently compacts cold data blocks with higher VDC to segregate cold data. This results in a higher fluctuation in VDC. Although memory devices have abilities to tolerate fluctuations in the VDC, as discussed above, the amplitude and the frequencies of the VDC deviations could overwhelm these abilities.

Aspects of the present disclosure address deficiencies of conventional garbage collection schemes with an approach to garbage collection source block selection that limits both the amplitude and frequency of the VDC deviations in garbage collection source blocks. Consistent with some embodiments, a garbage collection management component of a memory sub-system determines a VDC of each block in a memory device and identifies blocks with a VDC that satisfy a VDC constraint (e.g., by having a VDC that is lower than a VDC threshold). From the identified blocks, the garbage collection management component selects a first block as a potential garbage collection source block using a first garbage collection scheme such as the greedy VDC scheme described above. The garbage collection management component selects a second block from the identified blocks as another potential garbage collection source block using a second garbage collection scheme such as the 2D greedy VDC scheme described above. The garbage collection management component compares the first block and second block and selects one of the blocks as the garbage collection source block based on one or more comparison criterion. Garbage collection is then performed in accordance with the garbage collection source block selection by the garbage collection management component.

For some embodiments, the garbage collection management component tracks multiple garbage collection source block selections (e.g., selections of blocks with a VDC within a predetermined range of the minimum VDC in the memory device) and generates historical log data based thereon. The garbage collection management component can use the historical log data to select a garbage collection source block. For example, the garbage collection management component can select a first block as the garbage collection source block based on a number of consecutive selections of a second block. As with the above described selection process, garbage collection is performed in accordance with the garbage collection source block selection by the garbage collection management component.

For some embodiments, the garbage collection management component tracks the performance of a memory device over a period of time. The performance is sampled at certain intervals over a windowed period, and a log of the samples are stored in memory. The variation in performance can be used as a criterion to select the first or the second garbage collection source block.

Utilization of the above referenced approach to garbage collection improves memory device performance consistency by reducing the variation in the VDCs of garbage collection source blocks when hot/cold data separation is being conducted. As noted above, when segregating hot and cold data, frequently a cold block with high valid data count is compacted, which creates fluctuations in the host write vs garbage collection write ratio that can lead to inconsistencies in host performance. The approach described herein improves performance consistency by minimizing these fluctuations by selectively using the hot/cold data segregation scheme.

FIG. 1 illustrates an example computing system 100 that includes a memory sub-system 110, in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, and the like.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a host interface. Examples of a host interface include, but are not limited to, a serial advanced technology attachment (SATA) interface, a peripheral component interconnect express (PCIe) interface, USB interface, Fibre Channel, Serial Attached SCSI (SAS), Small Computer System Interface (SCSI), a double data rate (DDR) memory bus, a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the PCIe interface. The host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include negative-and (NAND) type flash memory and write-in-place memory, such as a three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC), can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks. For example, the memory device can include a set of blocks. Design specifications may define a constraint on a minimum number of valid blocks for the memory device 130 that may be different from the number of blocks in the set of blocks on the device.

Although non-volatile memory components such as NAND type flash memory (e.g., 2D NAND, 3D NAND) and 3D cross-point array of non-volatile memory cells are described, the memory device 130 can be based on any other type of non-volatile memory, such as read-only memory (ROM), phase change memory (PCM), self-selecting memory, other chalcogenide-based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), NOR flash memory, and electrically erasable programmable read-only memory (EEPROM).

The memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor 117 (processing device) configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, and the like. The local memory 119 can also include ROM for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130 and/or the memory device 140. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system 120 into command instructions to access the memory devices 130 and/or the memory device 140 and convert responses associated with the memory devices 130 and/or the memory device 140 into information for the host system 120.

In some embodiments, the memory devices 130 include local media controller 135 that operate in conjunction with memory sub-system controller 115 to execute operations on one or more memory cells of the memory devices 130 and 140.

The memory sub-system 110 also includes a garbage collection management component 113 that is responsible for managing garbage collection processes within the memory sub-system 110. As part of managing garbage collection within the memory sub-system 110, the garbage collection management component 113 selects, for each garbage collection cycle, a garbage collection source block from among blocks of the memory devices 130 and 140. At each garbage collection cycle, the garbage collection management component 113 utilizes multiple garbage collection schemes to select multiple candidates for the garbage collection source block and selects one of the blocks as the garbage collection source block based on a comparison of the candidates in accordance with one or more comparison criterion. Further details regarding garbage collection source block selection by the garbage collection management component 113 are discussed below.

In some embodiments, the memory sub-system controller 115 includes at least a portion of the garbage collection management component 113. For example, the memory sub-system controller 115 can include a processor 117 (processing device) configured to execute instructions stored in local memory 119 for performing the operations described herein. In some embodiments, the garbage collection management component 113 is part of the host system 120, an application, or an operating system. In some embodiments, the local media controller 135 includes at least a portion of the garbage collection management component 113.

Figure 2A:
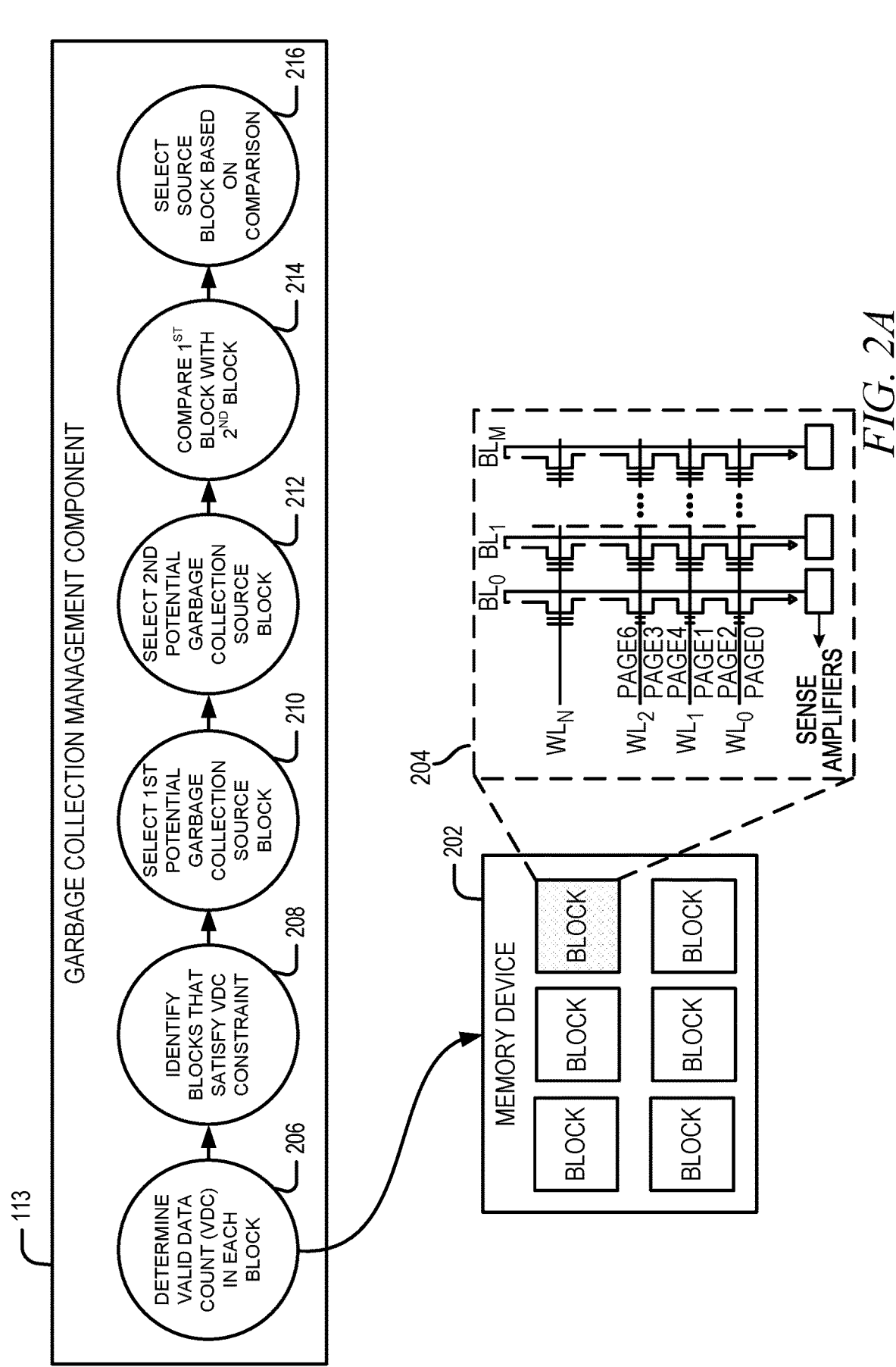
FIGS. 2A and 2B are conceptual diagrams illustrating example interactions between components of the memory sub-system in performing a method for selecting a garbage collection source block to control variation in valid data counts, in accordance with some embodiments of the present disclosure.
Figure 2B:
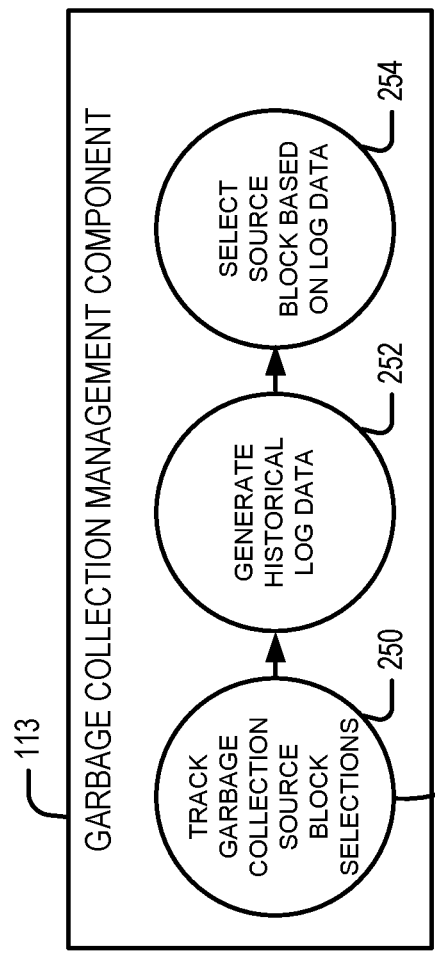
Figure 2B:
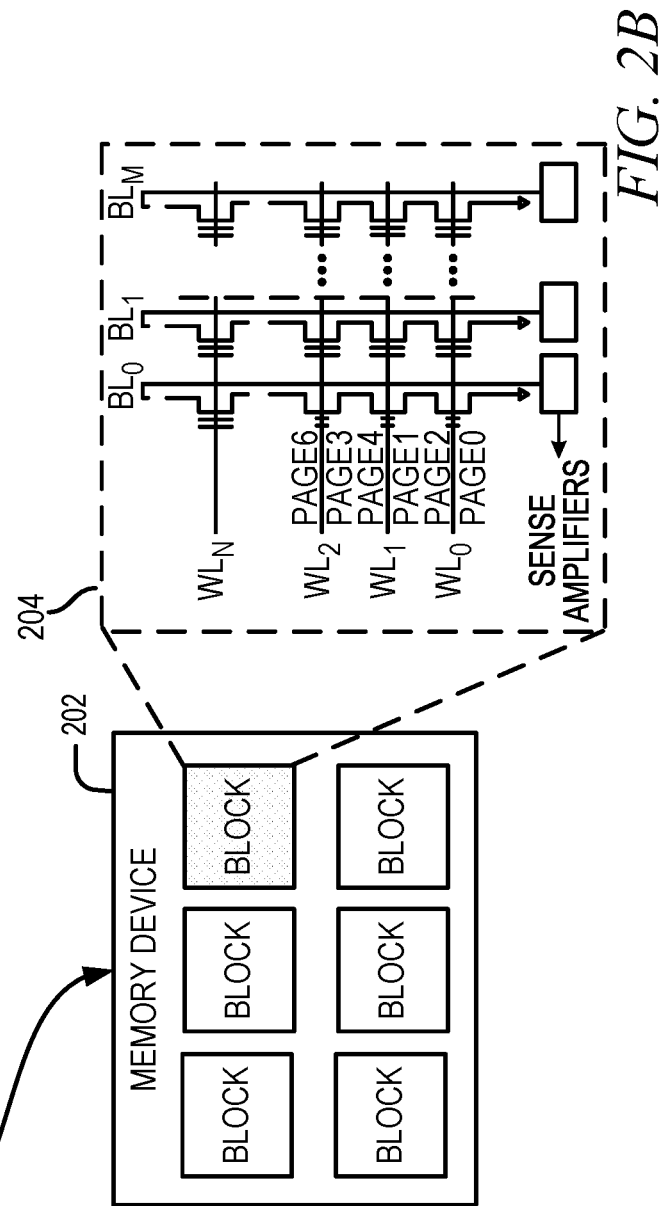

FIGS. 2A and 2B are conceptual diagrams illustrating example interactions between components of the memory sub-system in performing a method for selecting a garbage collection source block to control variation in valid data counts, in accordance with some embodiments of the present disclosure.

In the example illustrated, memory device 202 is an example memory device 130 in the example form of a NAND memory device including multiple memory blocks (e.g., memory block 204). A NAND memory block 204 includes a two-dimensional (2-D) array including pages (rows) and strings (columns). A three-dimensional (3D) NAND-type flash memory device includes multiple planes, each of which includes a set of memory blocks 204. A string includes a plurality of memory cells connected in series. Each memory cell is used to represent one or more bit values. A single NAND flash cell includes a transistor that stores an electric charge on a memory layer that is isolated by oxide insulating layers above and below.

As shown in FIG. 2A, at operation 206, the garbage collection management component 113 determines a VDC for each block 204 in the memory device 202. The VDC of a block refers to a number of pages in the block that store valid data. Based on the determined VDCs of the blocks 204, the garbage collection management component 113 identifies a subset of blocks 204 that satisfy a VDC constraint that specifies a VDC threshold (operation 208). A block 204 with a VDC that is below the VDC threshold satisfies the VDC constraint. Accordingly, the garbage collection management component 113 identifies a subset of blocks 204 that have a VDC that is lower than the VDC threshold.

From the subset of blocks 204, the garbage collection management component 113 uses a first garbage collection scheme to select a first block as a first candidate garbage collection source block (operation 210) and uses a second garbage collection scheme to select a second block as a second candidate garbage collection source block (operation 212). For some embodiments, the first garbage collection scheme results in selection of the block 204 with the lowest VDC among the subset of blocks 204 (also referred to as the "minimum VDC" of the memory device 202), and the second garbage collection scheme results in selection of a block 204 based on a combination of data temperature and VDC. The data temperature of a block refers to a frequency with which data stored by the block is updated. As an example of the second garbage collection scheme, the garbage collection management component 113 may calculate a score for each block 204 in the subset based on any one or more of: data temperature, VDC, one or more identifiers given by the host system, a total number of blocks containing data of certain temperature, an amount of host traffic of data with a certain temperature, and number of program/erase cycles performed at the block, and select the block with the lowest score.

The garbage collection management component 113 compares the first block and the second block, at operation 214, and selects either the first block or the second block as the garbage collection source block, at operation 216. The garbage collection management component 113 can utilize one or more comparison criterion for comparing the first and second block and selecting a garbage collection source block. In an example, the garbage collection management component 113 applies a weighting factor based on the one or more comparison criterion to the VDC of the first block and compares the weighted VDC of the first block with a VDC of the second block. If the VDC of the second block is greater than the weighted VDC value, the garbage collection management component 113 selects the first block (e.g., the block with the lowest VDC) as the garbage collection source block. If the VDC of the second block is equal to or less than the weighted VDC, the garbage collection management component 113 selects the second block as the garbage collection source block. The garbage collection is thereafter performed in accordance with the garbage collection source block selection.

The garbage collection management component 113 may repeat the garbage collection source block selection process described above at each garbage collection cycle, and as shown in FIG. 2B, the garbage collection management component 113 tracks each garbage collection source block selection, at operation 250. That is, the garbage collection management component 113 tracks which block is selected as the garbage collection source block at each garbage collection cycle along with the garbage collection scheme used to select the block selected as the garbage collection source block. At operation 252, the garbage collection management component 113 generates and stores historical log data based on the tracking. The historical log data includes an indication of which block was selected at each garbage collection source block selection. For some embodiments, the garbage collection management component 113 tracks only a subset of garbage collection source block selections. For example, the garbage collection management component 113 may track only selections of blocks with a VDC that is within a predefined range of a minimum VDC in the memory device 202.

The garbage collection management component 113 can use the historical log data as a basis for garbage collection source block selection for subsequent iterations of garbage collection (at operation 254). For example, the garbage collection management component 113 can select a garbage collection source block based on a number of consecutive garbage source block selections of the same block. That is, with returned reference to the first and second blocks discussed above in reference to FIG. 2A, if the number of consecutive selections of the first block as the garbage collection source block exceeds a predefined threshold number of consecutive selections, the processing device may select the second block as the garbage collection source block. Visa versa, if the number of consecutive selections of the second block as the garbage collection source block exceeds the predefined threshold number of consecutive selections, the processing device may select the first block as the garbage collection source block. As with the process described above, the garbage collection is performed in accordance with the garbage collection source block selected by the garbage collection management component 113.

Figure 3:
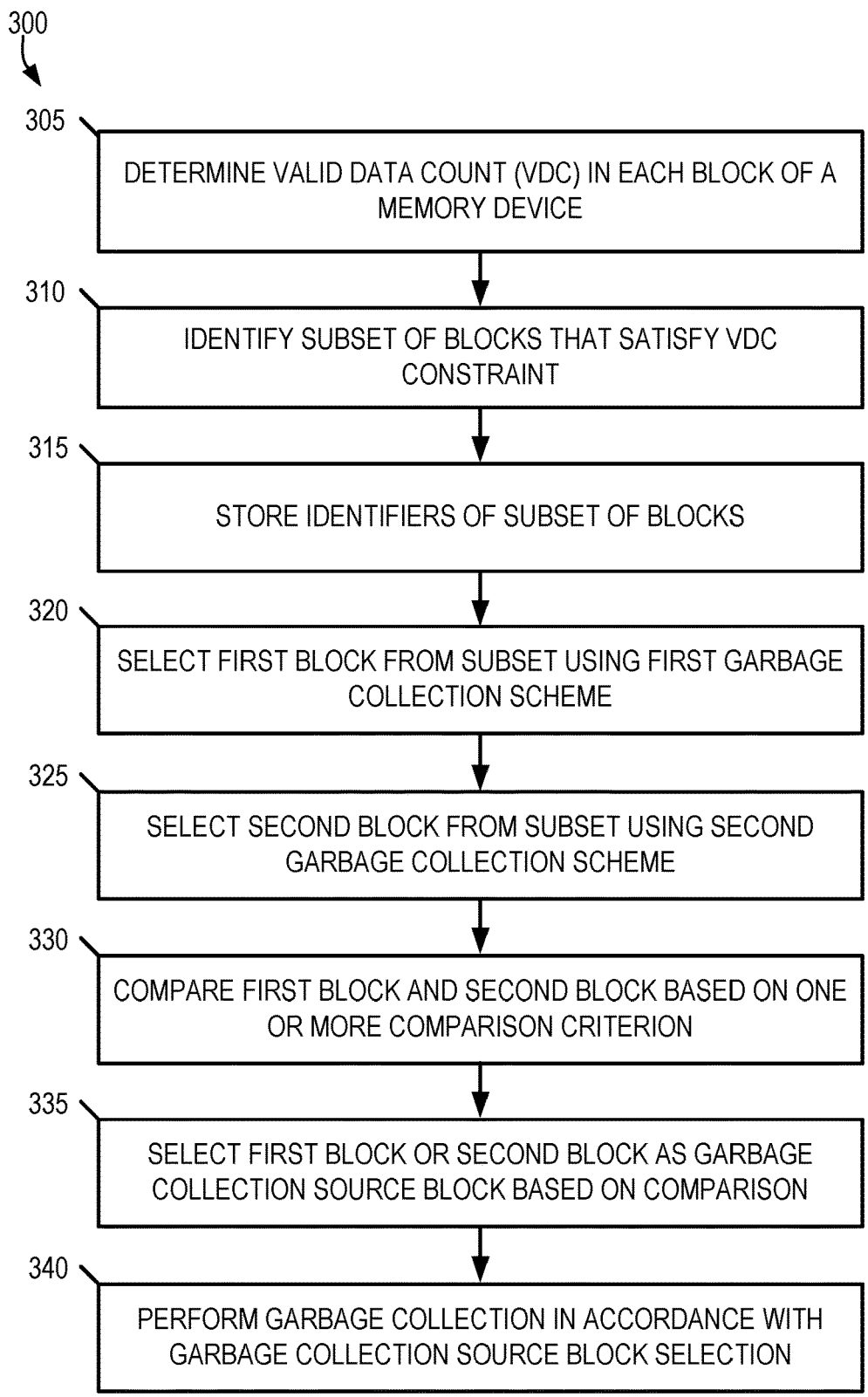
FIGS. 3 and 4 are flow diagrams illustrating a method for selecting a garbage collection source block that controls variation in valid data counts, in accordance with some embodiments of the present disclosure.
Figure 4:
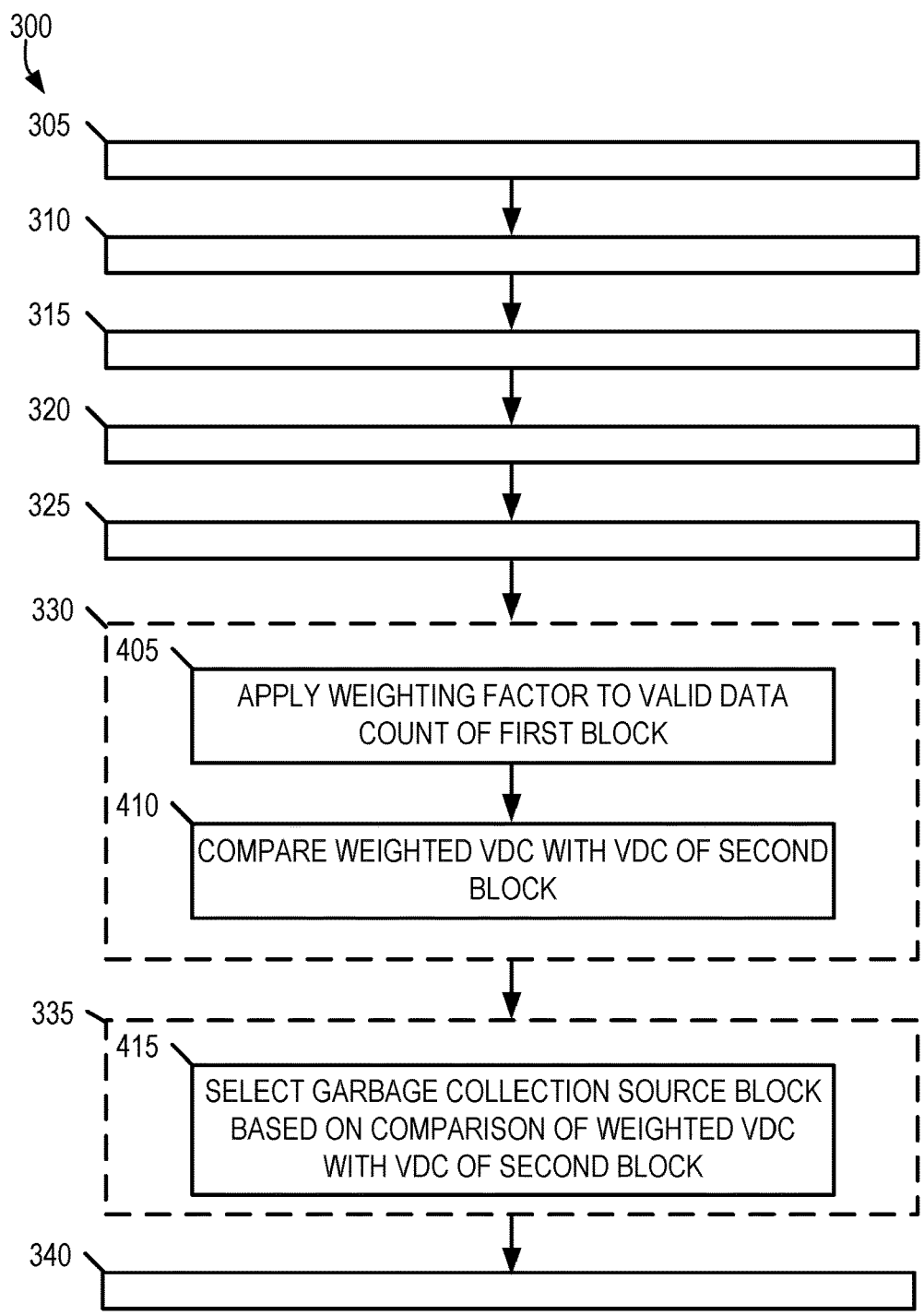

FIGS. 3 and 4 are flow diagrams illustrating a method for selecting a garbage collection source block that controls variation in valid data counts, in accordance with some embodiments of the present disclosure. The method 300 can be performed by processing logic that can include hardware (e.g., a processing device, circuitry, dedicated logic, programmable logic, microcode, hardware of a device, an integrated circuit, etc.), software (e.g., instructions run or executed on a processing device), or a combination thereof. In some embodiments, the method 300 is performed by the garbage collection management component 113 of FIG. 1. Although processes are shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

The method 300 begins at operation 305 where the processing device determines a VDC for each block of a memory device (e.g., the memory device 130). As previously noted, a VDC of a block indicates a number of pages in a block that store valid data.

At operation 310, the processing device identifies a subset of blocks in the memory device that satisfy a VDC constraint based on the VDCs determined for each block in the memory device. The VDC constraint comprises a threshold VDC. In determining whether a given block satisfies the VDC constraint, the processing device determines whether the VDC of the block is below the threshold VDC.

The processing device stores identifiers of each block in the identified subset in a table or other data structure in memory (e.g., local memory 119), at operation 315. For each block, the processing device may further store the VDC of the block.

At operation 320, the processing device selects, using a first garbage collection scheme, a first block from the subset based on the VDC of the first block. In the first garbage collection scheme, the block with the lowest VDC is selected. Hence, the first block selected by the processing device using the first garbage collection scheme is the block in the subset identified by the processing device as having the lowest VDC of blocks in the subset.

The processing device, at operation 325, selects, using a second garbage collection scheme, a second block from the subset based in part on a data temperature of the second block. As previously noted, the data temperature of a block refers to a frequency with which data stored by the block is updated. For some embodiments, garbage source block selection using the second garbage collection scheme includes calculating a score for each block based on a combination of a given block's data temperature, VDC, and number of program/erase cycles performed at the block. For example, let V denote the VDC of a block, P denote the number of program/erase cycles performed at a block, and T denote the data temperature of the block. In this example, the score S of a block is:

$$S = f(V, P, T, \ldots)$$

For these embodiments, the block in the subset with the lowest score S is selected based on the second garbage collection scheme.

At operation 330, the processing device performs a comparison of the first block selected using the first garbage collection scheme with the second block selected using the second garbage collection scheme in accordance with one or more comparison criterion. The processing device selects a garbage collection source block based on the comparison, at operation 335. That is, the processing device selects either the first block or the second block as the garbage collection source block based on the comparison. The processing device performs garbage collection at the garbage collection source block, at operation 340.

As shown in FIG. 4, the method 300 may, in some embodiments, include operations 405, 410, and 415. Consistent with these embodiments, the operations 405 and 410 can be performed as part of the operation 330 where the processing device performs a comparison of the first block selected using the first garbage collection scheme with the second block selected using the second garbage collection scheme. At operation 405, the processing device applies a weighting factor to the VDC of the first block (the lowest VDC in the subset of blocks with a VDC below the VDC threshold) based on the one or more comparison criterion. The application of the weighting factor to the VDC of the first block results in a weighted VDC. As an example with V denoting the VDC of the first block, the processing device can apply a weighting factor $\gamma$ resulting in a weighted VDC of $\gamma V$. The processing device compares the weighted VDC value with a VDC of the second block selected using the second garbage collection scheme, at operation 410.

Consistent with these embodiments, the operation 415 can be performed as part of operation 335 where the processing device selects the garbage collection source block. At operation 415, the processing device selects either the first or second block as the garbage collection source block based on the comparison of the weighted VDC value with the VDC of the second block. If the VDC of the second block is greater than the weighted VDC value (e.g., $>\gamma V$), the processing device selects the first block (e.g., the block with the lowest VDC) as the garbage collection source block. If the VDC of the second block is equal to or less than the weighted VDC (e.g., $\leq \gamma V$), the processing device selects the second block as the garbage collection source block. The weight $\gamma$ can be dynamically adjusted according to a historical log of the garbage collection source block VDCs or a historical log of memory device performance.

For some embodiments, blocks in the memory device can be sorted based on score S in ascending order (from lowest score to highest). Consistent with these embodiments, if the VDC of the second block is greater than the weighted VDC value (e.g., $>\gamma V$), the processing device selects the block with the second highest score S, and compares the weighted VDC with the first block again. This process continues for some limited iterations until a block is found with a VDC that is less than the weighted VDC value of the first block. If no such block is found, the processing device selects the first block as the garbage collection source block.

Figure 5:
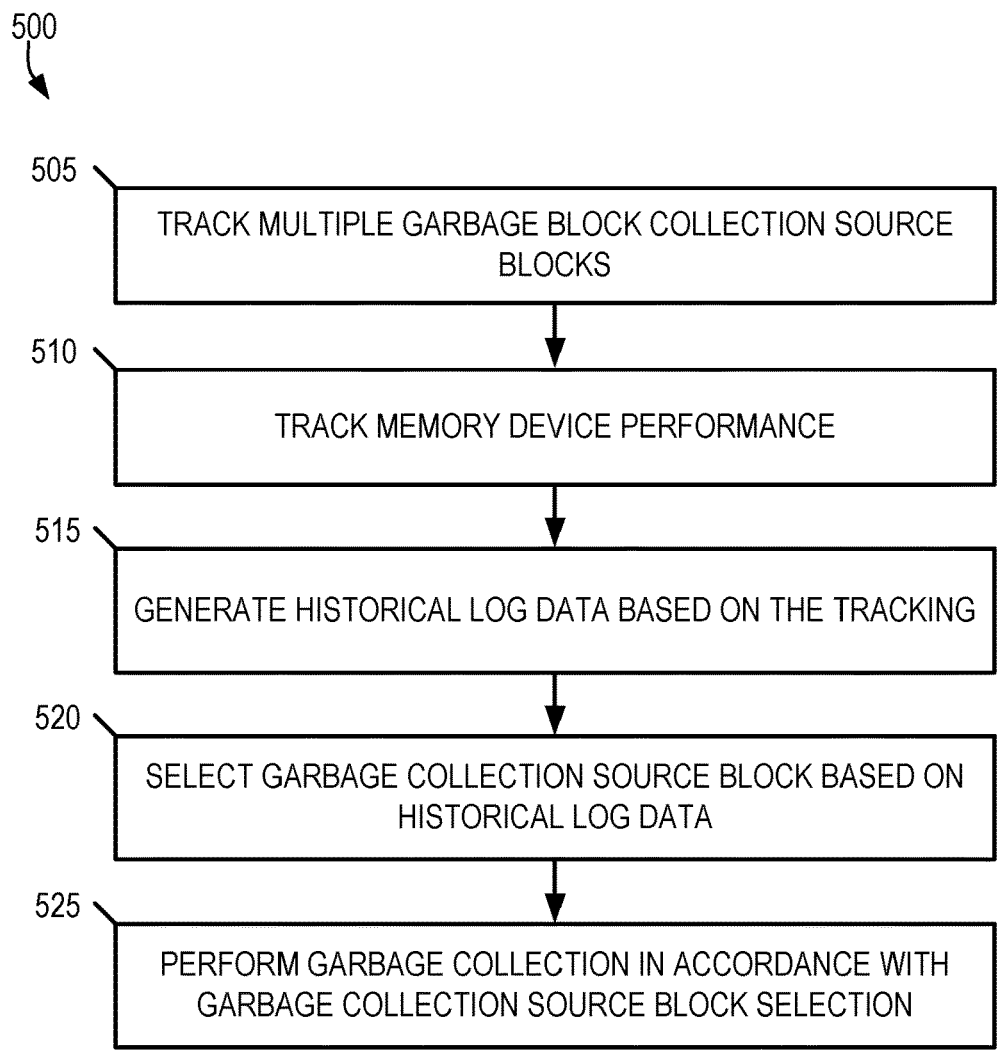
FIG. 5 is a flow diagram illustrating a method for selecting a garbage collection source block that controls variation in valid data counts, in accordance with some embodiments of the present disclosure.

FIG. 5 is a flow diagram illustrating a method 500 for selecting a garbage collection source block that controls variation in valid data counts, in accordance with some embodiments of the present disclosure. The method 500 can be performed by processing logic that can include hardware (e.g., a processing device, circuitry, dedicated logic, programmable logic, microcode, hardware of a device, an integrated circuit, etc.), software (e.g., instructions run or executed on a processing device), or a combination thereof. In some embodiments, the method 500 is performed by the garbage collection management component 113 of FIG. 1.

Although processes are shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 505, the processing device tracks multiple garbage collection source block selections for a memory device (e.g., memory device 130). Garbage collection source block selection refers to a process of selecting a block in the memory device as the garbage collection source block. For some embodiments, a garbage collection source block selection corresponds to the operation 335 described above with reference to method 300. Consistent with these embodiments, the method 300 may be repeatedly performed, and the processing device monitors which block is selected at operation 335 at each iteration.

At operation 510, the processing device tracks historical performance of the memory device. In tracking the historical performance of the memory device, the processing device may obtain routine measurements related to any one or more of: a throughput (or bandwidth) of the memory device measured at predetermined time periods; consistency of throughput (or variation in bandwidth); and quality of service (distribution of the latency of each host command request).

The processing at operation 515, generates historical log data based on the tracking of garbage collection source block selection and historical performance of the memory device. Hence, the historical log data includes garbage collection source block selection log data and memory device performance log data. The garbage collection source block selection log data includes an indication of which block was selected at each garbage collection source block selection. For some embodiments, the processing device tracks a subset of garbage collection source block selections. In these embodiments, the subset of garbage collection source block selections correspond to blocks with a VDC that is within a predefined range of a minimum VDC in the memory device. For example, the processing device may track and generate log data for blocks with a VDC that is in a predefined range of the block selected by the first garbage collection scheme (e.g., the first block referenced in the description of the method 300). The memory device performance log data may, for example, comprise one or more of: a measure of throughput (or bandwidth) of the memory device measured at each time period; a measure of consistency of the throughput (or variation in bandwidth) among the time periods; and a measure of quality of service at each time period.

The processing device selects, at operation 520, a garbage collection source block based on the historical log data. For example, the processing device may select a first block using the first garbage collection scheme, select a second block using the second garbage collection scheme in accordance with the description above in reference to method 300, and select either the first block or the second block as the garbage collection source block based on the historical log data. For some examples, the processing device selects the garbage collection source block based on a number of consecutive garbage source block selections of the same block. That is, if the number of consecutive selections of the first block as the garbage collection source block exceeds a predefined threshold number of consecutive selections, the processing device may select the second block as the garbage collection source block (at operation 520). Visa versa, if the number of consecutive selections of the second block as the garbage collection source block exceeds the predefined threshold number of consecutive selections, the processing device may select the first block as the garbage collection source block (at operation 520). The processing device performs garbage collection in accordance with the garbage collection source block selection, at operation 525.

For some embodiments, the processing device may adjust the weight γ (discussed above in reference to FIG. 4) based on the historical log data. The garbage collection source blocks scores produced by the second garbage collection scheme can be sorted, and the first block (within a maximum range of blocks) that satisfies the weighted VDC comparison may be selected. If no such block exists, the processing device selects the block identified by the first garbage collection scheme as the garbage collection source block.

Described implementations of the subject matter can include one or more features, alone or in combination as illustrated below by way of example.

Example 1 is a memory sub-system comprising: a memory device comprising a set of blocks; and a processing device, operatively coupled with the memory device, to perform operations comprising: identifying a subset of blocks from the set of blocks based on a valid data count constraint; selecting, using a first garbage collection source block selection scheme, a first block from the subset of blocks based on a valid data count of the first block, the valid data count of the first block comprising a number of pages in the block that store valid data; selecting, using a second garbage collection source block selection scheme, a second block from the subset of blocks based on a data temperature of the second block, the data temperature of the second block corresponding to a frequency with which data stored by the second block is updated; performing a comparison of the first block and the second block in accordance with one or more comparison criterion; selecting the first block or the second block as a garbage collection source block based on the comparison; and performing garbage collection at the garbage collection source block.

Example 2 includes the system of Example 1, wherein: the valid data count constraint comprises a valid data count threshold; and the identifying of the subset of blocks comprises identifying one or more blocks with a valid data count that is below the valid data count threshold.

Example 3 includes the system of any one or more of Examples 1 or 2, wherein the operations further comprise: determining a valid data count for each block in the set of blocks.

Example 4 includes the system of any one or more of Examples 1-3, wherein the operations further comprise storing, in memory, a set of identifiers corresponding to the subset of blocks, wherein the selecting of the first block and the second block comprises accessing the set of identifiers.

Example 5 includes the system of any one or more of Examples 1-4, wherein the selecting of the first block comprises selecting a block with a lowest valid data count among the subset of blocks.

Example 6 includes the system of any one or more of Examples 1-5, wherein the selecting of the second block from the subset comprises: determining a score for the second block based on a combination of the data temperature of the second block, a number of program/erase cycles performed at the second block, and a valid data count for the second block; and selecting the second block from the subset of blocks based on the score for the second block being the lowest among a set of scores corresponding to the subset of blocks.

Example 7 includes the system of any one or more of Examples 1-6, wherein performing the comparison of the first block and the second block in accordance with the one or more comparison criterion comprises: applying a weight to the valid data count of the first block based on the one or more comparison criterion, the applying of the weight to the valid data count resulting in a weighted valid data count; comparing the weighted valid data count corresponding to the first block with a valid data count of the second block; and selecting the garbage collection source block based on comparing the weighted valid data count corresponding to the first block with the valid data count of the second block.

Example 8 includes the system of any one or more of Examples 1-7, wherein: the garbage collection source block is a first garbage collection source block; further comprising: tracking multiple garbage collection source block selections; generating log data based on the tracking, the log data indicating which block was selected at each garbage collection source block selection; and selecting a second garbage collection source block based on the log data, the second garbage collection source block being different than the first garbage collection source block.

Example 9 includes the system of any one or more of Examples 1-8, wherein the multiple garbage collection selections correspond to blocks with a valid data count that is within a predefined range of the valid data count of the first block.

Example 10 includes the system of any one or more of Examples 1-9, wherein the selecting of the second garbage collection source block is based on a number of consecutive garbage collection source block selections corresponding to the first garbage collection source block.

Example 11 is a method comprising: identifying, by a processing device, a subset of blocks from a set of blocks of a memory device based on a valid data count constraint; selecting, using a first garbage collection source block selection scheme, a first block from the subset of blocks based on a valid data count of the first block, the valid data count of the first block comprising a number of pages in the block that store valid data; selecting, using a second garbage collection source block selection scheme, a second block from the subset of blocks based on a data temperature of the second block, the data temperature of the second block corresponding to a frequency with which data stored by the second block is updated; performing, by the processing device, a comparison of the first block and the second block in accordance with one or more comparison criterion; selecting, by the processing device, the first block or the second block as a garbage collection source block based on the comparison; and performing garbage collection at the garbage collection source block.

Example 12 includes the method of Example 11, wherein: the valid data count constraint comprises a valid data count threshold; and the identifying of the subset of blocks comprises identifying one or more blocks with a valid data count that is below the valid data count threshold.

Example 13 includes the method of any one or more of Examples 11 or 12, further comprising determining a valid data count for each block in the set of blocks.

Example 14 includes the method of any one or more of Examples 11-13, further comprising storing, in memory, a set of identifiers corresponding to the subset of blocks, wherein the selecting of the first block and the second block comprise accessing the set of identifiers.

Example 15 includes the method of any one or more of Examples 11-14, wherein the selecting of the first block comprises selecting a block with a lowest valid data count among the subset of blocks.

Example 16 includes the method of any one or more of Examples 11-15, wherein the selecting of the second block from the subset comprises: determining a score for the second block based on a combination of the data temperature of the second block, a number of program/erase cycles performed at the second block, and a valid data count for the second block; and selecting the second block from the subset of blocks based on the score for the second block being the lowest among a set of scores corresponding to the subset of blocks.

Example 17 includes the method of any one or more of Examples 11-16, wherein performing the comparison of the first block and the second block in accordance with the one or more comparison criterion comprises: applying a weight to the valid data count of the first block based on the one or more comparison criterion, the applying of the weight to the valid data count resulting in a weighted valid data count; comparing the weighted valid data count corresponding to the first block with a valid data count of the second block; and selecting the garbage collection source block based on comparing the weighted valid data count corresponding to the first block with the valid data count of the second block.

Example 18 includes the method of any one or more of Examples 11-17, wherein: the garbage collection source block is a first garbage collection source block; further comprising: tracking multiple garbage collection source block selections; generating historical log data based on the tracking, the historical log data indicating which block was selected at each garbage collection source block selection; and selecting a second garbage collection source block based on the historical log data, the second garbage collection source block being different than the first garbage collection source block.

Example 19 includes the method of any one or more of Examples 11-18, wherein the garbage collection source block is a first garbage collection source block; and further comprising: tracking performance of the memory device; generating log data based on the tracking of the performance of the memory device, the log data comprising one or more of: a measure of throughput of the memory device at one or more time periods; a measure of bandwidth of the memory device, a measure of consistency of the throughput among the one or more time periods; a measure of variation in bandwidth among the one or more time periods; and a measure of the quality of service at the one or more time periods; and selecting a second garbage collection source block based on the log data.

Example 20 is a non-transitory computer-readable storage medium comprising instructions that, when executed by a processing device, configure the processing device to perform operations comprising: identifying a subset of blocks from a set of blocks of a memory device based on a valid data count constraint; selecting, using a first garbage collection source block selection scheme, a first block from the subset of blocks based on a valid data count of the first block, the valid data count of the first block comprising a number of pages in the block that store valid data; selecting, using a second garbage collection source block selection scheme, a second block from the subset of blocks based on a data temperature of the second block, the data temperature of the second block corresponding to a frequency with which data stored by the second block is updated; performing a comparison of the first block and the second block in accordance with one or more comparison criterion; selecting the first block or the second block as a garbage collection source block based on the comparison; and performing garbage collection at the garbage collection source block.

Figure 6:
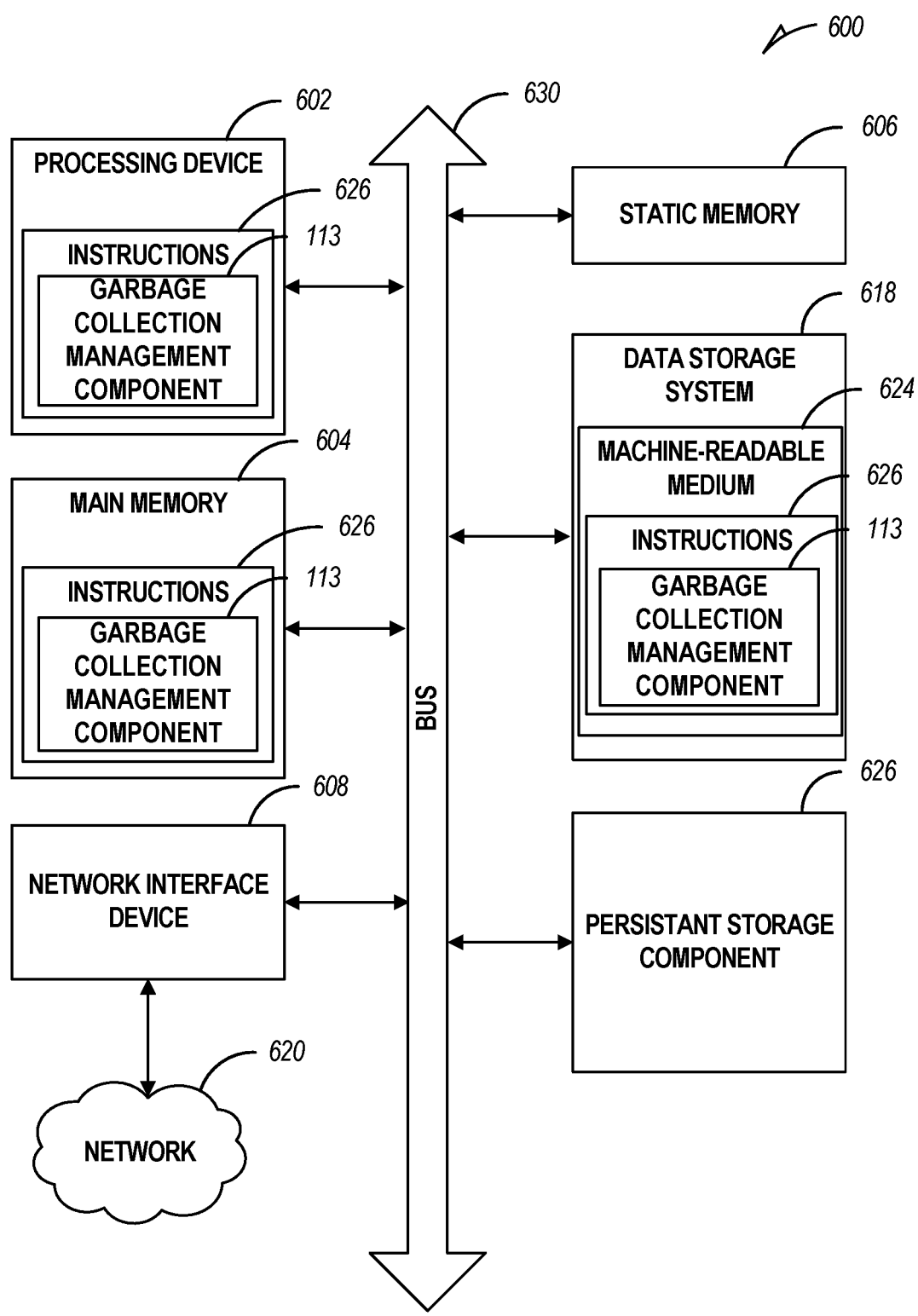
FIG. 6 is a block diagram of an example computer system in which embodiments of the present disclosure may operate.

FIG. 6 illustrates an example machine in the form of a computer system 600 within which a set of instructions can be executed for causing the machine to perform any one or more of the methodologies discussed herein. In some embodiments, the computer system 600 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the garbage collection management component 113 of FIG. 1). In alternative embodiments, the machine can be connected (e.g., networked) to other machines in a local area network (LAN), an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., ROM, flash memory, DRAM such as SDRAM or RDRAM, etc.), a static memory 606 (e.g., flash memory, static random access memory (SRAM), etc.), and a data storage system 618, which communicate with each other via a bus 630.

Processing device 602 represents one or more general-purpose processing devices such as a microprocessor, a central processing unit, or the like. More particularly, the processing device 602 can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 can also be one or more special-purpose processing devices such as an ASIC, a FPGA, a digital signal processor (DSP), network processor, or the like. The processing device 602 is configured to execute instructions 626 for performing the operations and steps discussed herein. The computer system 600 can further include a network interface device 608 to communicate over a network 620.

The data storage system 618 can include a machine-readable storage medium 624 (also known as a computer-readable medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to the memory sub-system 110 of FIG. 1.

In one embodiment, the instructions 626 include instructions to implement functionality corresponding to a data destruction component (e.g., the garbage collection management component 113 of FIG. 1). While the machine-readable storage medium 624 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to convey the substance of their work most effectively to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, ROMs, RAMs, EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a ROM, RAM, magnetic disk storage media, optical storage media, flash memory components, etc.

In the foregoing specification, embodiments of the disclosure have been described with reference to specific example embodiments thereof. It will be evident that various modifications can be made thereto without departing from the broader scope of embodiments of the disclosure as set forth in the following claims. The specification and drawings are, accordingly, to be regarded in an illustrative sense rather than a restrictive sense.

What is claimed is:

1. A memory sub-system comprising:
a memory device comprising a set of blocks; and
a processing device, operatively coupled with the memory device, to perform operations comprising:
identifying a subset of blocks from the set of blocks based on a valid data count constraint;
selecting, using a first garbage collection source block selection scheme, a first block from the subset of blocks based on a valid data count of the first block, the valid data count of the first block comprising a number of pages in the block that store valid data;
selecting, using a second garbage collection source block selection scheme, a second block from the subset of blocks based on a data temperature of the second block, the data temperature of the second block corresponding to a frequency with which data stored by the second block is updated;
performing a comparison of the first block and the second block in accordance with one or more comparison criterion;
selecting the first block or the second block as a first garbage collection source block based on the comparison;
performing garbage collection at the first garbage collection source blocky tracking multiple garbage collection source block selections;
generating historical log data based on the tracking, the historical log data indicating which block was selected at each garbage collection source block selection; and
selecting a second garbage collection source block based on the historical log data, the second garbage collection source block being different than the first garbage collection source block.

2. The memory sub-system of claim 1, wherein:
the valid data count constraint comprises a valid data count threshold; and
the identifying of the subset of blocks comprises identifying one or more blocks with a valid data count that is below the valid data count threshold.

3. The memory sub-system of claim 2, wherein the operations further comprise:
determining a valid data count for each block in the set of blocks.

4. The memory sub-system of claim 1, wherein the operations further comprise storing, in memory, a set of identifiers corresponding to the subset of blocks, wherein the selecting of the first block and the second block comprise accessing the set of identifiers.

5. The memory sub-system of claim 1, wherein the selecting of the first block from the subset of blocks comprises selecting a block with a lowest valid data count among the subset of blocks.

6. The memory sub-system of claim 1, wherein the selecting of the second block from the subset of blocks comprises:
determining a score for the second block based on a combination of the data temperature of the second block, a number of program/erase cycles performed at the second block, and a valid data count for the second block; and
selecting the second block from the subset of blocks based on the score for the second block being a lowest among a set of scores corresponding to the subset of blocks.

7. The memory sub-system of claim 1, wherein performing the comparison of the first block and the second block in accordance with the one or more comparison criterion comprises:
applying a weight to the valid data count of the first block based on the one or more comparison criterion, the applying of the weight to the valid data count resulting in a weighted valid data count;
comparing the weighted valid data count corresponding to the first block with a valid data count of the second block; and
selecting the first garbage collection source block based on comparing the weighted valid data count corresponding to the first block with the valid data count of the second block.

8. The memory sub-system of claim 1, wherein the multiple garbage collection selections correspond to blocks with a valid data count that is within a predefined range of the valid data count of the first block.

9. The memory sub-system of claim 1, wherein the selecting of the second garbage collection source block is based on a number of consecutive garbage collection source block selections corresponding to the first garbage collection source block.

10. A method comprising:
identifying, by a processing device, a subset of blocks from a set of blocks of a memory device based on a valid data count constraint;
selecting, using a first garbage collection source block selection scheme, a first block from the subset of blocks based on a valid data count of the first block, the valid data count of the first block comprising a number of pages in the block that store valid data;
selecting, using a second garbage collection source block selection scheme, a second block from the subset of blocks based on a data temperature of the second block, the data temperature of the second block corresponding to a frequency with which data stored by the second block is updated;
performing, by the processing device, a comparison of the first block and the second block in accordance with one or more comparison criterion;
selecting, by the processing device, the first block or the second block as a first garbage collection source block based on the comparison;
performing garbage collection at the first garbage collection source block;
tracking multiple garbage collection source block selections;
generating historical log data based on the tracking, the historical log data indicating which block was selected at each garbage collection source block selection; and
selecting a second garbage collection source block based on the historical log data, the second garbage collection source block being different than the first garbage collection source block.

11. The method of claim 10, wherein:
the valid data count constraint comprises a valid data count threshold; and
the identifying of the subset of blocks comprises identifying one or more blocks with a valid data count that is below the valid data count threshold.

12. The method of claim 11, further comprising determining a valid data count for each block in the set of blocks.

13. The method of claim 10, further comprising storing, in memory, a set of identifiers corresponding to the subset of blocks, wherein the selecting of the first block and the second block comprise accessing the set of identifiers.

14. The method of claim 10, wherein the selecting of the first block comprises selecting a block with a lowest valid data count among the subset of blocks.

15. The method of claim 10, wherein the selecting of the second block from the subset of blocks comprises:
determining a score for the second block based on a combination of the data temperature of the second block, a number of program/erase cycles performed at the second block, and a valid data count for the second block; and
selecting the second block from the subset of blocks based on the score for the second block being a lowest among a set of scores corresponding to the subset of blocks.

16. The method of claim 10, wherein performing the comparison of the first block and the second block in accordance with the one or more comparison criterion comprises:
applying a weight to the valid data count of the first block based on the one or more comparison criterion, the applying of the weight to the valid data count resulting in a weighted valid data count;
comparing the weighted valid data count corresponding to the first block with a valid data count of the second block; and
selecting the first garbage collection source block based on comparing the weighted valid data count corresponding to the first block with the valid data count of the second block.

17. The method of claim 10,
further comprising:
tracking performance of the memory device;
wherein the historical log data further comprises one or more of: a measure of throughput of the memory device at one or more time periods; a measure of bandwidth of the memory device; a measure of consistency of the throughput among the one or more time periods; a measure of variation in bandwidth among the one or more time periods; and a measure of a quality of service at the one or more time periods.

18. A non-transitory computer-readable storage medium comprising instructions that, when executed by a processing device, configure the processing device to perform operations comprising:
identifying a subset of blocks from a set of blocks of a memory device based on a valid data count constraint;
selecting, using a first garbage collection source block selection scheme, a first block from the subset of blocks based on a valid data count of the first block, the valid data count of the first block comprising a number of pages in the block that store valid data;
selecting, using a second garbage collection source block selection scheme, a second block from the subset of blocks based on a data temperature of the second block, the data temperature of the second block corresponding to a frequency with which data stored by the second block is updated;
performing a comparison of the first block and the second block in accordance with one or more comparison criterion;
selecting the first block or the second block as a first garbage collection source block based on the comparison;
performing garbage collection at the first garbage collection source block;
tracking multiple garbage collection source block selections;
generating historical log data based on the tracking, the historical log data indicating which block was selected at each garbage collection source block selection; and
selecting a second garbage collection source block based on the historical log data, the second garbage collection source block being different than the first garbage collection source block.

19. The non-transitory computer-readable storage medium of claim 18, wherein:
the valid data count constraint comprises a valid data count threshold; and
the identifying of the subset of blocks comprises identifying one or more blocks with a valid data count that is below the valid data count threshold.

20. The non-transitory computer-readable storage medium of claim 18, wherein the selecting of the first block from the subset of blocks comprises selecting a block with a lowest valid data count among the subset of blocks.

* * * * *